(12) United States Patent
Anderson

(10) Patent No.: US 6,859,930 B2
(45) Date of Patent: Feb. 22, 2005

(54) SYSTEM AND METHOD FOR PERFORMING SERVICE OPERATIONS

(75) Inventor: Brian P. Anderson, Peoria, IL (US)

(73) Assignee: Caterpillar Inc, Peoria, IL (US)

(*) Notice: Subject to any disclaimer, the term of this patent is extended or adjusted under 35 U.S.C. 154(b) by 340 days.

(21) Appl. No.: 09/740,443

(22) Filed: Dec. 19, 2000

(65) Prior Publication Data
US 2002/0078254 A1 Jun. 20, 2002

(51) Int. Cl.[7] .................................... G06F 15/163
(52) U.S. Cl. ................. 719/310; 700/168; 700/169
(58) Field of Search .................. 719/310; 700/168, 700/169; 709/310

(56) References Cited
U.S. PATENT DOCUMENTS
6,033,226 A * 3/2000 Bullen et al. ............... 434/219
6,222,533 B1 * 4/2001 Notani et al. ............... 345/733

* cited by examiner

Primary Examiner—Meng-Al T. An
Assistant Examiner—LeChi Truong
(74) Attorney, Agent, or Firm—Howard & Howard; W Bryan McPherson

(57) ABSTRACT

A system and method for performing service operations on a machine. The system includes first and second computer based service tools and a computer based workbench having first and second application proxies and a binary network object with first and second interfaces. The first application proxy is coupled to the first computer based service tool and the second application proxy is coupled to the second computer based service tool. The first computer based service tool has access to service information in the second computer based service tool through the computer based workbench.

25 Claims, 4 Drawing Sheets

Fig_1_

Fig-2-

SYSTEM AND METHOD FOR PERFORMING SERVICE OPERATIONS

TECHNICAL FIELD

The present invention relates generally to service operations for machine and more particularly, to a system and method for sharing information regarding a machine between service tools.

BACKGROUND ART

Computer software tools are used in performing service type operations for certain types of machines. For example, field technicians utilize a number of tools to diagnose, retrieve information stored in external databases, retrieve information from sources on the machines, such as electronic control modules, and the like.

Typically, such tools are computer based and reside in a portable computer such as a notebook computer. Such tools were designed to communicate, i.e., share information using one of several different interprocess communication protocols, e.g., the Transmission Control Protocol/Internet Protocol (TCP/IP), Dynamic Data Exchange (DDE), or the Component Object Model (COM).

With the advent of these tools, it has been become desirable to link the various software tools to share and exchange information or control data. However, since the various software tools did not share a common communication protocol, the software tools would normally have to be revised to include integration modules which facilitated communication between one tool and one other tool.

Revising the tools to use a single protocol is time consuming and inefficient. Additionally, different protocols have different benefits which may be suitable for one tool and not for another.

The present invention is directed to overcoming one or more of the problems as set forth above.

DISCLOSURE OF THE INVENTION

In one aspect of the present invention a system for performing service operations on a machine is provided. The system includes first and second computer based service tools and a computer based workbench. The computer based workbench includes first and second application proxies and a binary network object with first and second interfaces. The application proxies are connected to one another through a stable integration protocol and binary network object. The first application proxy is coupled to the first computer based service tool and the second application proxy is coupled to the second computer based service tool. The first computer based service tool has access to service information in the second computer based service tool through the computer based workbench.

In another aspect of the present invention a method for sharing service information between first and second service tools is provided. The method includes the steps providing a binary network object having first and second interfaces. The method also includes the steps of providing a first application proxy coupled to the first interface and providing a second application proxy coupled to the second interface. The method further includes the step of sharing service information between the first and second computer based service tools through the first and second application proxies and the first and second interfaces.

BEST MODE FOR CARRYING OUT THE INVENTION

Figure 1:
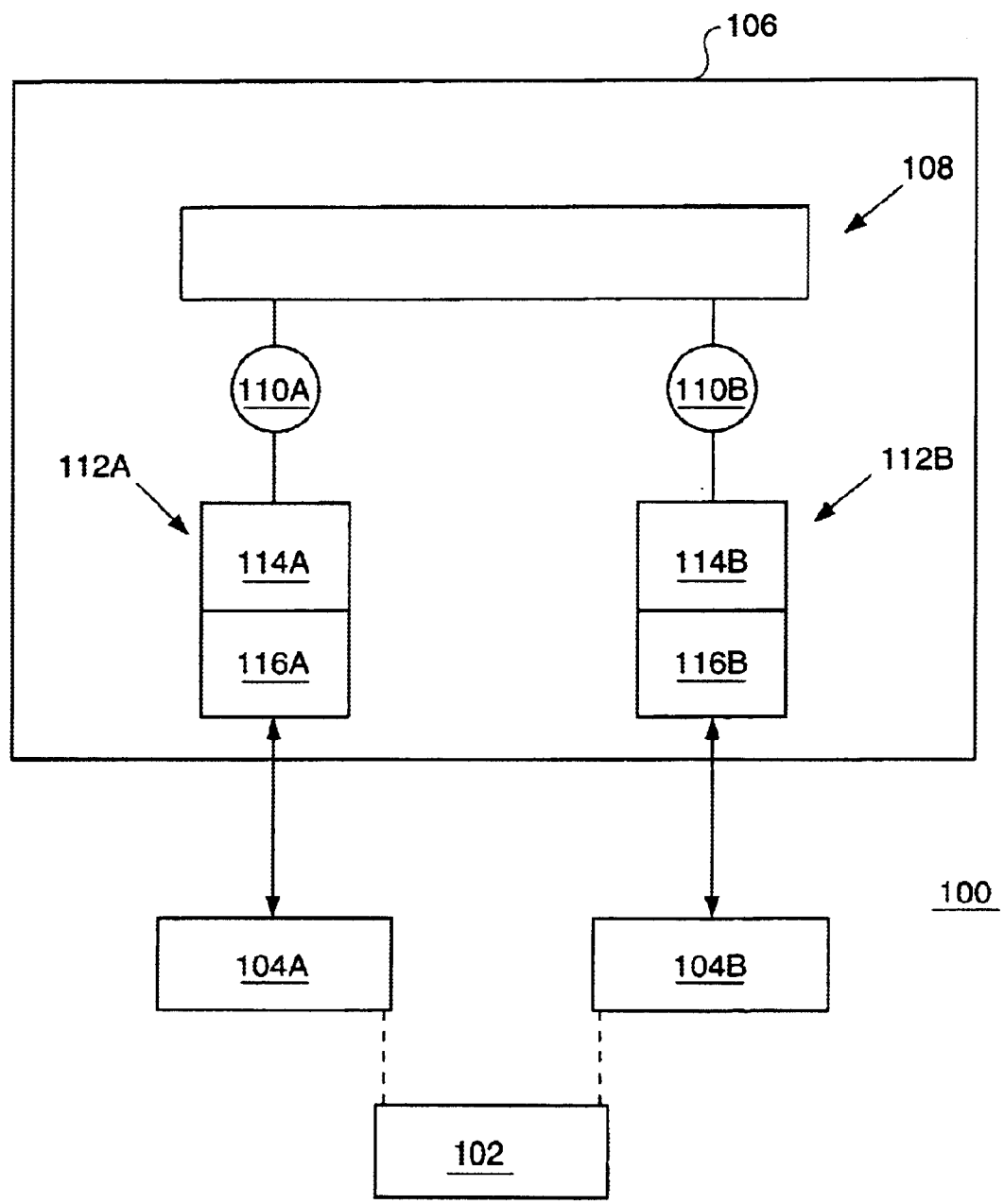
FIG. 1 is a block diagram of a system for performing service operations on a machine, according to an embodiment of the present invention.

With reference to the drawings and in operation, the present invention provides a system 100 and method for performing service operations on a machine 102. With specific reference to FIG. 1, the system includes first and second computer based service tools 104A,104B.

The system 100 also includes a computer based workbench 106 which includes a binary network object 108. The binary network object 108 includes first and second interfaces 110A, 110B. As described below, the binary network object 108 allows the first and second service tools 104A, 104B to communicate, i.e., share information.

Preferably, the workbench 106 is a computer based tool implemented on a portable computer (not shown) with at least one of the first and second computer based service tools 104A, 104B.

The workbench 106 provides a common graphical user interface (see below) for a user to access and operate the first and second computer based service tools 104A, 104B.

The workbench 106 includes a first application proxy 112A and a second application proxy 112B coupled to the first and second service tools 104A, 104B respectively.

The first and second application proxies 112A, 112B each includes a constant portion 114A, 114B and an application programming interface 116A, 116B.

In the preferred embodiment, the binary network object 108 is implemented using the Component Object Model or COM. The binary network object 108 includes first and second interfaces 110A, 110B coupled to the constant portions 114A, 114B of the first and second application proxies 112A, 112B, respectively.

As described below, this arrangement allows one of the first and second computer based service tools 104A, 104B to have access to information on the other service tool 104A, 104B.

Figure 2:
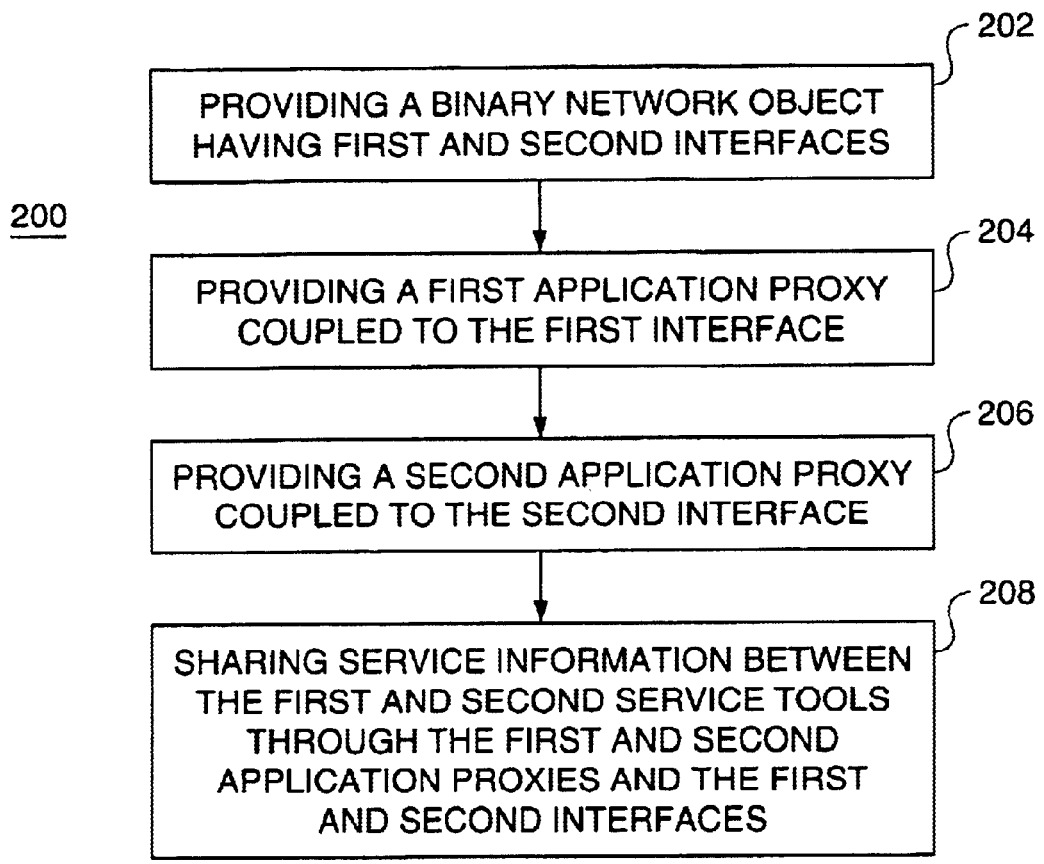
FIG. 2 is a flow diagram of a method for sharing service information between first and second service tools, according to an embodiment of the present invention.

With reference to FIG. 2, a method 200 for sharing service information between the first and second service tools 104A, 104B is shown. In a first control block 202, the binary network object 108 having first and second interfaces 110A, 110B is provided. In a second control block 204, the first application proxy coupled to the first interface is provided. In a third control block 206, the second application proxy coupled to the second interface is provided. In a fourth control block 206, service information is shared between the first and second service tools 104A, 104B through the first and second application proxies 112A, 112B and the first and second interfaces 110A, 110B.

Figure 3:
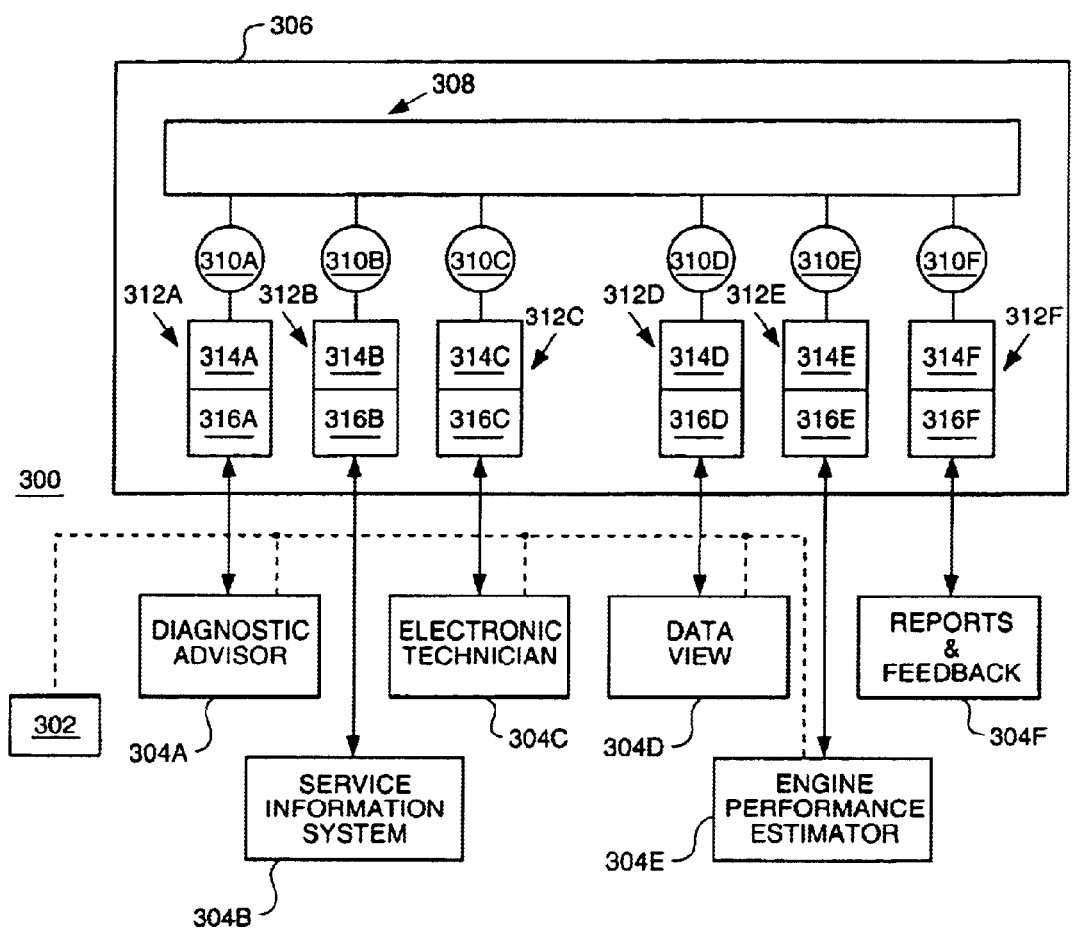
FIG. 3 is a block diagram of a system for performing for performing service operations on a machine, according to another embodiment of the present invention; and, FIG. 4 is a diagrammatic illustration of a graphical user interface, according to an embodiment of the present invention.

With reference to FIG. 3, a system 300 for providing service operations to a work machine 302 is illustrated. The work machine can be any sort of machine such as an earthmoving machine, construction machine, transportation machine, engine, computer, air conditioner, etc... This list is exemplary only and not intended to be exclusive. In the system 300 a plurality of service tools 304A–304F are provided.

A Diagnostic Advisor 304A provides a computer based method and system and a computer program for providing case based diagnostics for the work machine 302.

A Service Information System (SIS) 304B includes service information related to the work machine 302. Preferably, the SIS 304B includes system functional tests, diagnostic code procedures, and other service information.

An Electronic Technician (ET) 304C is a computer software program for communication with electronic controls the work machine 302 and for retrieving information therefrom. The ET 304C is coupled to an onboard datalink and is able to read diagnostic and event codes, status parameters in real-time and to perform electronic control module calibrations and configurations.

A Data View Module 304D for viewing data related to the work machine 302. For example, the Data View Module 304D is able to read (remotely) and display sensor data.

An Engine Performance Estimator (EPE) 304E and a Reports and Feedback Module 304F are also provided. The EPE 304E is a service tool designed specifically for truck engines to help a field technician resolve customer performance complaints, e.g., low power and/or poor fuel economy.

The prior enumeration of service tools is exemplary only and not intended to be exclusive.

The service tools 304A–304F are able to share information through a workbench 306. For example, the Diagnostic Advisor 304A may contain links to information contained in the SIS 304B to support its recommendations. The Diagnostic Advisor 304A, SIS 304B, Electronic Technician 304C, Data View Module 304D, EPE and Reports and Feedback Module 304F are discussed further in U.S. patent application Ser. No. 09/742,879 filed on Dec. 20, 2000 and U.S. patent application Ser. No. 09/745,228 filed on Dec. 20, 2000, which are hereby incorporated by reference.

The workbench 306 includes a binary network object 308 having first through sixth interfaces 310A-object 308 having first through sixth interfaces 310A–310F. First through sixth application proxies 312A–312F couple the service tools 304A–304F to the workbench 306 and each other 304A–304F via the respective interface 310A–310F.

In the preferred embodiment, the system 100 and method 200 of the present invention is embodied in a computer program product, i.e., software. The computer program product comprises a computer useable storage medium having computer readable program code means embodied in the medium.

Figure 4:
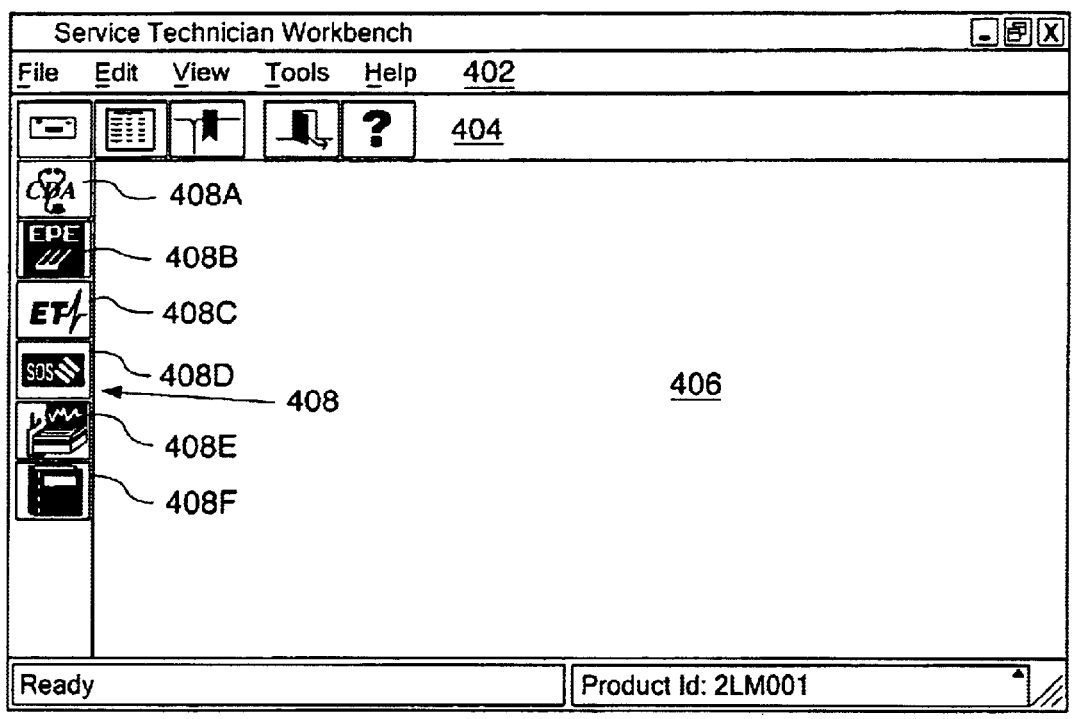

With reference to FIG. 4, the present invention provides a graphical user interface 400 for use by the user 110 to interface with the system 100. The graphical user interface 400 includes Menu Bar 402, a Tool Bar 404, an application container 406, and a Launch Pad 408. The Launch Pad 408 includes a plurality of buttons for providing access to the service tools 104A–104B, 304A–304F. For example, the Launch Pad 408 includes a Diagnostic Advisor Button 408A, an Engine Performance Estimator Button 408B, an Electronic Technician Button 408C, an SIS Button 408D, a Data View Button 408E, and a Reports and Feedback Button 408F. Actuation of a button 408A–408F launches a respective service tools 304A–304F in the application container 406.

INDUSTRIAL APPLICABILITY

Each of the service tools 104A–104B, 304A–304F were designed to communicate externally, i.e., to the other service tools 104A–104B, 304A–304F through the workbench 106, 306, using a communication protocol suitable to the service tool and its operation. For example, the Electronic Technician 304C communicates using the Dynamic Data Exchange protocol (DDE), the Diagnostic Advisor 304A communicates using the Component Object Model (COM), the SIS 304B communicates using the Transmission Control Protocol/Internet Protocol (TCP/IP), and the Data View Module 304D uses operating system messages to implement focus switching functionality.

As described above, each of the service tools 104A, 104B, 304A–304F is accessible through the graphical user interface 400 of the workbench 106, 306. The workbench 106, 306 consolidates access to all of the service tools 104A, 104B, 304A–304F through a single sign-on and provides a common look and feel.

The application proxy 112A, 112B, 312A–312F for each service tool 104A, 104B, 304A–304F includes a constant portion 114A, 114B, 314A–314F and an application programming interface 116A, 116B, 316A–316F. The constant portion 114A, 114B, 314A–314F allows a service tool 104A, 104B, 304A–304F to communicate with the other service tools 104A, 104B, 304A–304F. The constant portion 114A, 114B, 314A–314F typically does not change. The application programming interface 116A, 116B, 316A–316F couples the constant portions 114A, 114B, 314A–314F with the respective service tool 104A, 104B, 304A–304F. The application programming interface 116A, 116B, 316A–316F is custom written for each service tool 104A, 104B, 304A–304F 314A–314F in a variety of interprocess communication protocols (DDE, COM, TCP/IP, etc.). This allows the service tools 104A, 104B, 304A–304F to be updated with the latest technology (code, platform, etc.) without affecting the communications between the service tools 104A, 104B, 304A–304F and without modification of the constant portion 114A, 114B, 314A–314F. This allows for a seamless flow of information and control data between the service tools 104A, 104B, 304A–304F thereby saving programming time and effort.

Other aspects, objects, and features of the present invention can be obtained from a study of the drawings, the disclosure, and the appended claims.

What is claimed is:

1. A system (100) for performing service operations on a machine (102, 302), comprising:
    a first computer based service tool (104A);
    a second computer based service tool (104B);
    a computer based workbench (106, 306) having first and second application proxies (112A, 112B), said first and second application proxies (112A, 112B) each having a constant portion (114A, 114B) respectively and a binary network object (108) with first and second interfaces (110A, 110B), coupled to said first and second application proxies the first application proxy (112A) being coupled to the first computer based service tool (104A) the second application proxy (112B) being coupled to the second computer based service tool (104B), wherein the first computer based service tool (104A) has access to service information in the second computer based service tool (104B) through the respective constant portions (114A, 114B) in the computer based workbench (106) wherein the first computer based service tool (104A) provides diagnostic services that determine a status of the machine (102), or a portion thereof.

2. A system (100), as set forth in claim 1, wherein the machine (102) is mobile work machine (102).

3. A system (100), as set forth in claim 1, wherein the binary network object (108) uses the Component Object Model.

4. A system (100), as set forth in claim 1, wherein the first and second application proxies (112A, 112B) of the first and second application proxies (112A, 112B) respectively each comprise a constant portion (114A, 114B) coupled to the binary network object (108) of the computer based workbench (106) and an application programming interface (116A, 116B) coupled to the constant portion (114A, 114B) of the first computer based service tool and the second computer based service tool.

5. A system (100), as set forth in claim 4, wherein data is communicated by one of the service tools (104A, 104B) to an other of the service tools (104A, 104B) through the respective constant portions (114A, 114B).

6. A system (100), as set forth in claim 5, wherein the first and second computer based service tools (104A, 104B) communicate using a respective communication protocol.

7. A system (100, as set forth in claim 6, wherein the application programming interface (116A, 116B) of each of the first and second service tools (104A, 104B) is adapted to communicate using the respective communication protocol.

8. A system (100) for performing service operations on a machine (102), comprising:
 a first computer based service tool (104A);
 a second computer based service tool (104B);
 a computer based workbench (106) having first and second application proxies (112A, 112B), said first and second application proxies (112A, 112B) each having a constant portion (114A, 114B) respectively and a binary network object (108) with first and second interfaces (110A, 110B), coupled to said first and second application proxies, the first application proxy (112A) being coupled to the first computer based service tool (104A) and the second application proxy (112B) being coupled to the second computer based service tool (104B), wherein the first computer based service tool (104A) has access to service information in the second computer based service tool (104B) through 114B) in the computer based workbench (106), the computer based workbench (106) includes a graphical user interface (400), the first and second computer based service tools (104A, 104B) being accessible through the graphical user interface (400), and wherein the first computer based service tool (104A) provides diagnostic services that determine a status of the machine (102), or a portion thereof.

9. A system (100), as set forth in claim 8, wherein the graphical user interface (400) includes an application container (406) and a launch pad (408), wherein the launch pad (408) includes first and second buttons (408A–408F) and wherein actuation of one of the first and second buttons (408A–408F) launches a respective one of the first and second service tools (104A, 104B) in the application container (406).

10. A system (300) for performing service operations on a machine (302), comprising:
 a computer based diagnostic advisor (304A);
 a computer based service information system (304B);
 a computer based workbench (306) having first and second application proxies (312A, 312B), said first and second application proxies (312A, 312B) each having a constant portion (114A, 114B) respectively, and a binary network object (308) with first and second interfaces (310A, 310B), coupled to said first and second application proxies, the first application proxy (312A) being coupled to the computer based diagnostic advisor (304A) and the second application proxy (312B) being coupled to the computer based service information system (304B), wherein the diagnostic advisor (304A) has access to service information in the service information system (304B) through the respective constant portions (114A, 114B) in the computer based workbench (306) and wherein the diagnostic advisor (304A) provides diagnostic services that determine a status of the machine (302), or a portion thereof.

11. A system (300), as set forth in claim 10, including a computer based electronic technician (304C) and wherein the binary network object (308) includes a third interface (312C) and the computer based workbench (306) includes a third application proxy (312C), third application proxy (312C) being coupled to the computer based electronic technician (304C).

12. A system (300), as set forth in claim 10, including a computer based data view module (304D) and wherein the binary network object (308) includes a fourth interface (312D) and the computer based workbench (306) includes a fourth application proxy (312D), the fourth application proxy (312D) being coupled to the computer based data view module (304D).

13. A system (300), as set forth in claim 10, including a computer based engine performance estimator (304E) and wherein the binary network object (308) includes a fifth interface (312E) and the computer based workbench (306) includes a fifth application proxy (312E), the fifth application proxy (312E) being coupled to the computer based engine performance estimator (304E).

14. A system (300), as set forth in claim 10, including a computer based reports and feedback module (304F) and wherein the binary network object (308) includes a sixth interface (312F) and the computer based workbench (306) includes a sixth application proxy (312F), the sixth application proxy (312F) being coupled to the computer based reports and feedback module (304F).

15. A method (200) for sharing service information associated with a machine between first and second service tools (104A, 104B), including the steps of:
 providing a binary network object (108) having first and second interfaces (110A, 110B);
 providing a first application proxy (112A) coupled to the first interface (110A), wherein said first application proxy (112A) having a constant portion (114A);
 providing a second application proxy (112B) coupled to the second interface (110B), wherein said second application proxy (112B) having a constant portion (114B); and,
 sharing service information between the first and second computer based service tools (104A, 104B) through the respective constant potions (114A, 114B) in the first and second application proxies (112A, 112B) and the first and second interfaces (110A, 110B), and wherein the first computer based service tool (104A) provides diagnostic services that determine a status of the machine, or a portion thereof.

16. A method (200), as set forth in claim 15, wherein the machine (102) is a mobile work machine (102).

17. A method (200), as set forth in claim 15, wherein the binary network object (108) uses the Component Object Model.

18. A method (200), as set forth in claim 15, wherein the first and second application proxies (112A, 112B) each comprise a constant portion (114A, 114B) coupled to the binary network object (108) of the computer based workbench (106) and an application programming interface (116A, 116B) coupled to the constant portion (114A, 114B) of the first computer based service tool and the second computer based service tool.

19. A method (200), as set forth in claim 18, including the step of communicating data by one of the service tools (104A, 104B) to an other of the service tools (104A, 104B) through the respective constant portions (114A, 114B).

20. A method (200), as set forth in claim 19, wherein the first and second computer based service tools (104A, 104B) communicate using a respective communication protocol.

21. A method (200), as set forth in claim 20, wherein the application programming interface (116A, 116B) of each of the first and second service tools (104A, 104B) is adapted to communicate using the respective communication protocol.

22. A method (200) for sharing service information associated with a machine, between first and second service tools (104A, 104B), including the steps of:

providing a binary network object (108) having first and second interfaces (110A, 110B);

providing a first application proxy (112A) coupled to the first interface (110A), wherein said first applicant proxy (112A) having a constant portion (114A);

providing a second application proxy (112B) coupled to the second interface (110B), wherein said second application proxy (112B) having a constant portion (114B);

sharing service information between the first and second computer based service tools (104A, 104B) through the respective constant portions (114A, 114B) in the first and second application proxies (112A, 112B) and the first and second interfaces (110A, 110B); and, providing a graphical user interface (400), the first and second computer based service tools (104A, 104B) being accessible through the graphical user interface (400), and wherein the first computer based service tool (104A) provides diagnostic services that determine a status of the machine, or a portion thereof.

23. A method (200), as set forth in claim 22, including the step of providing the graphical user interface (400) with an application container (406) and a launch pad (408), wherein the launch pad (408) includes first and second buttons (408A–408F) and wherein actuation of one of the first and second buttons (408A–408F) launches a respective one of the first and second service tools (104A, 104B) in the application container (406).

24. A method (200) for sharing service information associated with a machine between a computer based diagnostic advisor (304A) and a computer based service information system (304B), including the steps of:

providing a binary network object (108) having first and second interfaces (110A, 110B);

providing a first application proxy (112A) coupled to the first interface (110A), wherein said first applicant proxy (112A) having a constant portion (114A);

providing a second application proxy (112B) coupled to the second interface (110B), wherein said second application proxy (112B) having a constant portion (114B); and, sharing service information between the computer based diagnostic advisor (304A) and the computer based service information system (304B) through the respective constant portions (114A, 114B) in the first and second application proxies (112A, 112B) and the first and second interfaces (110A, 110B), and wherein the computer based diagnostic advisor (304A) provides diagnostic services that determine a status of the machine, or a portion thereof.

25. A computer program product for sharing service information associated with a machine, between a first computer based service tool (104A) and a second computer based service tool (104B), including the steps of:

computer readable program code means for providing a binary network object (108) having first and second interfaces (110A, 110B);

computer readable program code means for providing a first application proxy (112A) coupled to the first interface (110A), wherein said first applicant proxy (112A) having a constant portion (114A);

computer readable program code means for providing a second application proxy (112B) coupled to the second interface (110B), wherein said second application proxy (112B) having a constant portion (114B); and computer readable program code means for sharing service information between the first and second computer based service tools (104A, 104B) through the respective constant portions (114A, 114B) in the first and second application proxies (12A, 112B) and the first and second interfaces (110A, 110B, wherein the first computer based service tool (104A) provides diagnostic services that determine a status of the machine, or a portion thereof).

\* \* \* \* \*

UNITED STATES PATENT AND TRADEMARK OFFICE
CERTIFICATE OF CORRECTION

PATENT NO. : 6,859,930 B2
DATED : February 22, 2005
INVENTOR(S) : Brian P. Anderson It is certified that error appears in the above-identified patent and that said Letters Patent is hereby corrected as shown below:

Column 4,
Line 56, after "(104A)" insert -- and --

Column 5,
Line 5, delete "of the first and second application proxies (112A, 112B) respectively"
Line 7, after "(114A, 114B)" and insert -- of the first and second application proxies (112A, 112B) respectively --
Line 20, delete "(100,", and insert -- (100), --
Line 40, after "through" insert -- the respective constant portions (114A, --

Column 6,
Line 16, after "(312C)," insert -- the --
Line 54, delete "potions" and insert -- portions --

Column 7,
Line 24, delete "applicant" and insert -- application --

Column 8,
Line 6, delete "applicant" and insert -- application --
Line 30, delete "applicant" and insert -- application --
Line 40, delete "applicant" and insert -- application --
Line 40, delete "12A" and insert -- 112A --

Signed and Sealed this

Seventh Day of June, 2005

JON W. DUDAS
*Director of the United States Patent and Trademark Office*